(12) United States Patent
Liu (10) Patent No.: US 8,194,403 B2
(45) Date of Patent: Jun. 5, 2012

(54) DISPLAY WITH SLIDE STRUCTURE

(75) Inventor: Huai Sheng Liu, Zhonghe (TW)

(73) Assignee: Top Victory Investments Ltd., Harbour (HK)

( * ) Notice: Subject to any disclaimer, the term of this patent is extended or adjusted under 35 U.S.C. 154(b) by 198 days.

(21) Appl. No.: 12/835,870

(22) Filed: Jul. 14, 2010

(65) Prior Publication Data

US 2011/0019346 A1 Jan. 27, 2011

(30) Foreign Application Priority Data

Jul. 23, 2009 (TW) ................................ 98124899 A (51) Int. Cl.
*G06F 1/16* (2006.01)
(52) U.S. Cl. .................. 361/679.21; 455/575.3; 349/59; 248/286.1
(58) Field of Classification Search .................. 455/566, 455/575.3, 575.1, 41.2; 349/2, 58, 59; 379/433.07; 345/169, 1.3, 184, 156, 684, 173, 419, 650; 248/574, 616, 122.1, 286.1, 201, 220.21, 248/220.31; 361/679.07, 679.01, 679.21, 361/679.41, 679.27, 679.26, 679.54, 679.06

See application file for complete search history.

(56) References Cited

U.S. PATENT DOCUMENTS

| | | | |
|---|---|---|---|
| 6,288,891 B1 * | 9/2001 | Hasegawa et al. | 361/679.07 |
| 6,807,276 B2 * | 10/2004 | Hirayama et al. | 379/433.07 |
| 7,830,471 B2 * | 11/2010 | Okumura et al. | 349/59 |
| 2009/0029741 A1 * | 1/2009 | Satou et al. | 455/566 |

* cited by examiner

*Primary Examiner* — Hung Duong
(74) *Attorney, Agent, or Firm* — Alan Kamrath; Kamrath IP Lawfirm, PA (57) ABSTRACT

The present invention is related to a display with slide structure. The display comprises a rear casing, a stand, a fixing unit, a movable unit and at least one spring. The stand has an arc structure disposed beneath. The fixing unit is firmly disposed at the rear casing and contains at least one first holding part and at least one rail. The movable unit connects with the stand and contains at least one second holding part; wherein the movable unit is repeatedly movable by means of the rail. The spring is respectively connected to the first holding part and the second holding part with two ends. Whereby, the stand could be repeatedly movable against the rear casing by means of the movable unit and touch a flat surface by distinct sites of the arc structure, so that the display might maximize its inclined angle.

15 Claims, 7 Drawing Sheets

DISPLAY WITH SLIDE STRUCTURE

FIELD OF THE INVENTION

The present invention relates to a display, particularly to a display with slide structure.

DESCRIPTION OF THE PRIOR ART

In recent year, due to the cost down of the flat panel display, the display has gradually come into vogue in home TV and computer display. Besides, because of its thinness and light characters comparative to cathode-ray-tube television, the flat panel display will be more and more favorable and easily seen in public such as station, hospital, convenient store or theater. Those flat panel displays not only can be utilized to deliver message, but also can achieve some advertising purpose. Thus, the usage and application of flat panel display will be wider and wider.

Figure 1:
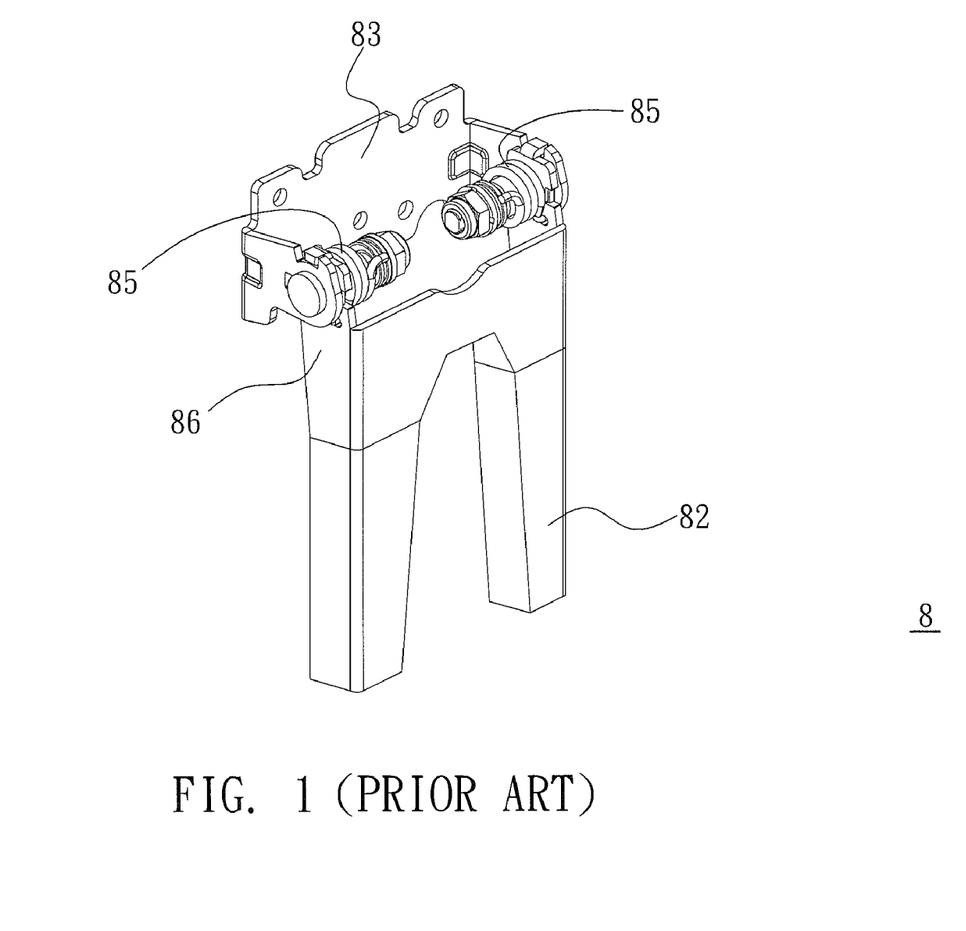
FIG. 1 is diagram of torque-type pedestal of conventional display.

Please refer to FIG. 1, FIG. 1 is diagram of torque-type pedestal of conventional display. As shown in FIG. 1, a torque-type pedestal 8 of conventional display (not shown) includes a fixing unit 83 and a rotative unit 86. The linkage area of the fixing unit 83 and the rotative unit 86 contain two springs 85, so that the fixing unit 83 could sustain the torque of the rotative unit 86. When the torque-type pedestal 8 is used in the conventional display, the fixing unit 83 could be disposed inside the display and the rotative unit 86 could be connected to a stand 82, so that the stand 82 could be changed into distinct tilted angle by means of rotation of the rotative unit 86. Therefore, the display might be disposed on a flat surface with distinct tilted angle. However, when the display becomes heavier, the weight the torque-type pedestal 8 needs to sustain is higher. For this reason, the springs 85 need to increase the coefficient of elasticity, so that the coil of the springs 85 or the diameter of the coil shall be consequently increased. It's bulky and space-wasted, so that the display might not achieve thin character. Besides, the torque-type pedestal 8 is also inconvenient for people to push the display tilted by means of only one hand.

Figure 2:
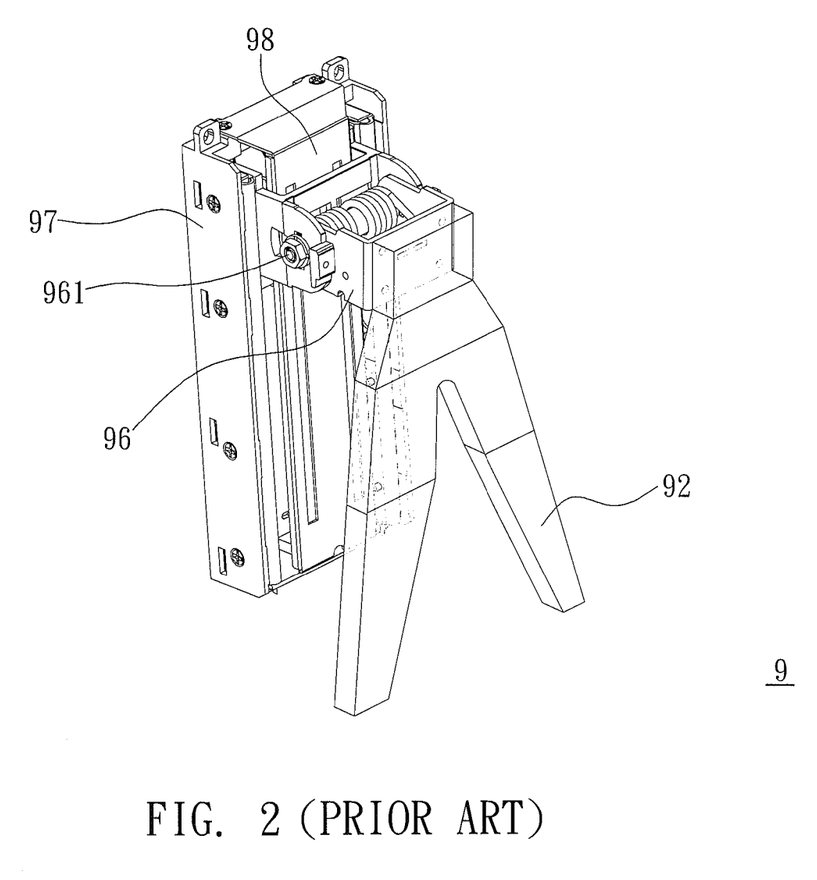
FIG. 2 is diagram of force-type pedestal of conventional display.

Please refer to FIG. 2, FIG. 2 is diagram of force-type pedestal of conventional display. As shown in FIG. 2, a force-type pedestal 9 includes a frame 97, a sliding unit 98 and a rotative unit 96. The sliding unit 98 might be repeatedly moved up and down, relative to the frame 97. The linkage area of the sliding unit 98 and the rotative unit 96 contain a axis 961, so that the rotative unit 96 might be rotated against the sliding unit 98 and changed into distinct tilted angle. When the force-type pedestal 9 is used in the conventional display, the frame 97 could be disposed inside the display and the rotative unit 96 could be connected to a stand 92, so that the stand 82 could be changed into distinct tilted angle by means of repeated movement of the sliding unit 98 and rotation of the rotative unit 96. Therefore, the display might be disposed on a flat surface with distinct tilted angle. However, force-type pedestal 9 is also space-wasted, so that it cannot be achieved thin character. Moreover, the force-type pedestal 9 is expensive, complicated, and has high failure rate and too many components to be conveniently maintained.

Thus, how to reduce space occupation and manufacturing cost, simplify the mechanical configuration and maximize the tilted angle of the display by only one hand, is a critical issue needed to be settled.

SUMMARY OF THE INVENTION

The primary object of present invention is to save the space occupation of the connecting stand, so that the display may achieve thin character.

Another object of present invention is to reduce manufacturing cost, simplify the mechanical configuration and push the display tilted by only one hand.

The other object of present invention is to maximize the tilted angle of the display.

To achieve the foregoing and other objects, a display with slide structure is provided. The display comprises a rear casing, a stand, a fixing unit, a movable unit and at least one spring. The stand has an arc structure disposed beneath. The fixing unit is firmly disposed at the rear casing and contains at least one first holding part and at least one rail. The movable unit connects with the stand and contains at least one second holding part; wherein the movable unit is repeatedly movable by means of the rail. The spring is respectively connected to the first holding part and the second holding part with two ends. Whereby, the stand could be repeatedly movable against the rear casing by means of the movable unit and touch a flat surface by distinct sites of the arc structure, so that the display might maximize its inclined angle.

In the aforementioned display with slide structure, wherein a lubricative layer is disposed at the contact area between the rail and the movable unit; the material of the lubricative layer could be teflon, non-woven fabrics or other product with low friction coefficient. Thus the friction of movement could be reduced and as a result the movement might be smoother.

In the aforementioned display with slide structure, wherein the shape of the arc structure could be circular arc, elliptical arc or the arc with variant curvature.

In the aforementioned display with slide structure, wherein the surface of the arc structure is rough or coated with anti-slip material, so as to achieve anti-slip function.

In the aforementioned display with slide structure, wherein the movable unit and the stand is firmly fixed and connected by means of screw.

In the aforementioned display with slide structure, wherein the fixing unit is firmly fixed at the rear casing by means of screw.

In the aforementioned display with slide structure, wherein the first holding part or the second holding part is hook-shaped, so that the end of the spring could hook the first holding part or the second holding part.

In the aforementioned display with slide structure, wherein the number of the spring, the first holding part and the second holding part is even number which is greater than 2, and then two ends of each spring are connected to one of the first holding parts and one of the second holding parts respectively; the pluralities of the springs, the first holding parts and the second holding parts are respectively disposed at right and left of the movable unit with symmetry. Therefore it can prevent uneven force applied on both sides of the movable unit, and make sure the undesired torque will not happen.

In the aforementioned display with slide structure, wherein the first holding part is disposed beneath the second holding part and the spring is disposed between the first holding part and the second holding part, wherein the spring has a tensile force against the first holding part and the second holding part; the first holding part and the second holding part stretch the spring when the stand or the movable unit is moved upward.

In the aforementioned display with slide structure, wherein the first holding part is disposed above the second holding part and the spring is disposed between the first holding part and the second holding part, wherein the spring pushes the first holding part and the second holding part outward; the first holding part and the second holding part compress the spring when the stand or the movable unit is moved upward.

In the aforementioned display with slide structure, wherein the display further comprises at least one resisting block disposed at the fixing unit or at the rear casing, so as to limit the moving distance of the movable unit and prevent the movable unit from leaving the rail.

Whereby, the display with slide structure of present invention could reduce space occupation and manufacturing cost of the display, simplify the mechanical configuration and maximize the tilted angle of the display by only one hand, so as to achieve thin character. In addition, the components of the display are relatively few and the configuration is also simple, therefore the failure rate, manufacture and maintenance cost may be absolutely reduced as well. Furthermore, pluralities of springs could sustain larger and heavier display. Therefore, the present invention may have several advantages and improve convenience, and thus has extremely market potential.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 3:
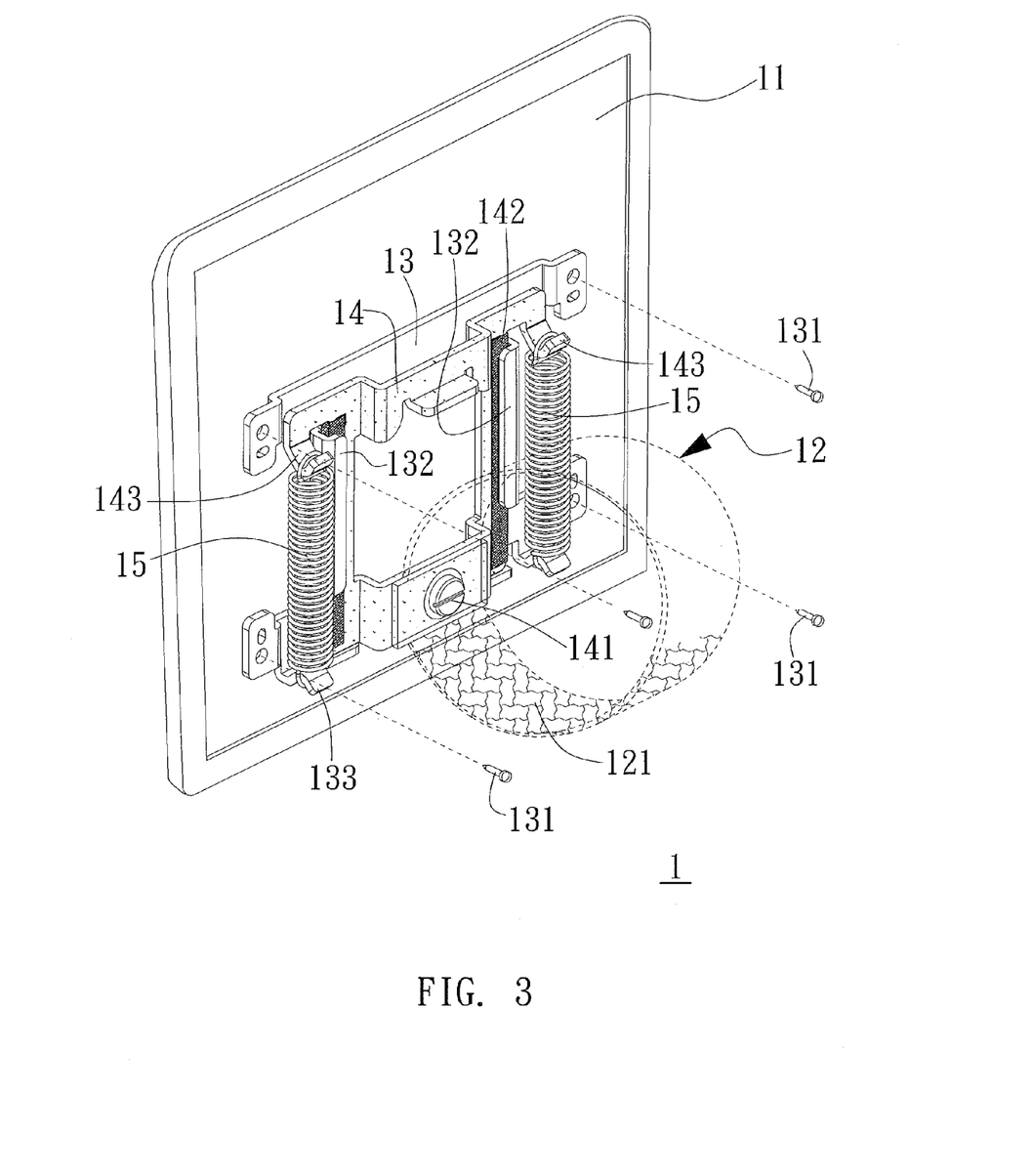
FIG. 3 is diagram depicting the display with slide structure while the springs are not yet stretched.

Please refer to FIG. 3, FIG. 3 is diagram depicting the display with slide structure while the springs are not yet stretched. As shown in FIG. 3, a display 1 includes a rear casing 11, a stand 12, a fixing unit 13, a movable unit 14 and two springs 15. The fixing unit 13 is disposed at the rear casing 11 by means of fastening the corner of the fixing unit 13 to the rear casing 11 by pluralities of screws 131, and as a result the fixing unit 13 is firmly fixed. The fixing unit 13 contains two hook-shaped first holding parts 133 at bottom half and two rails 132. The movable unit 14 is disposed near the fixing unit 13 and is connected to the stand 12 by means of the fastened screw 141. The stand 12 contains a curved-shaped arc structure 121 disposed at bottom half of the stand 12. Wherein, the shape of the arc structure 121 could be circular arc, elliptical arc or the arc with variant curvature. The stand 12 and the movable unit 14 could be repeatedly moved up and down by means of two rails 132. The movable unit 14 further contains two hook-shaped second holding parts 143 at upper half. Two ends of each spring 15 are respectively hooked by the hook-shaped first holding part 133 and second holding part 143, so that two ends of each spring 15 are connected to one of the first holding parts 133 and one of the second holding parts 143. Additionally, two springs 15 are respectively disposed at right and left of the movable unit 14; thus, the springs 15, the first holding parts 133 and the second holding parts 143 are respectively disposed at right and left of the movable unit with symmetry. It can prevent uneven force applied on both sides of the movable unit 14, and make sure the undesired torque against the fixing unit 13 will not happen. Therefore, when the display 1 is raised, the first holding parts 133 and the second holding parts 143 could move close to each other by means of the elastic force of two springs 15. As a result, due to the downward pull force of the springs 15 exerting on the movable unit 14, the stand 12 could move to bottom half of the display 1.

Figure 4:
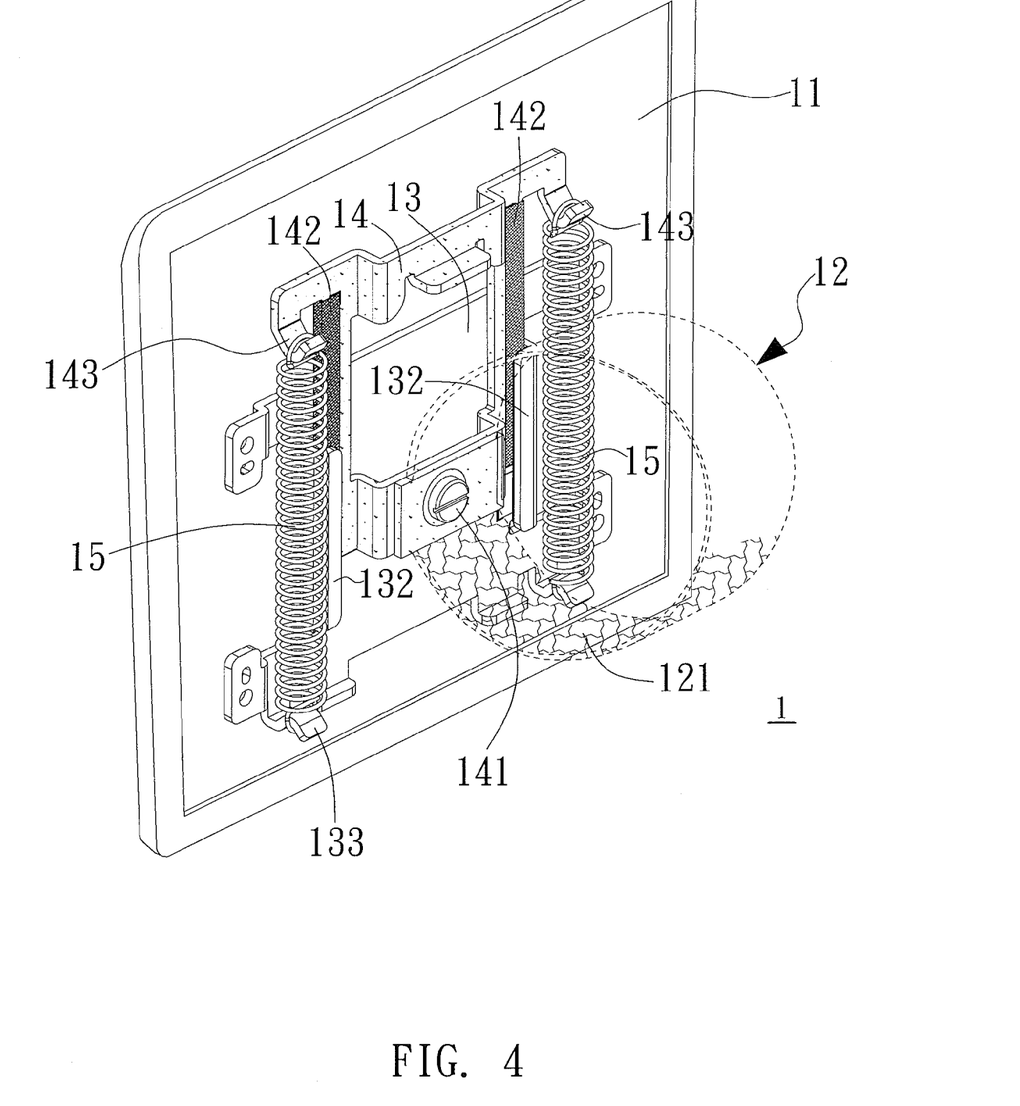
FIG. 4 is diagram depicting the display with slide structure while the springs are stretched.

Next, please refer to FIG. 3 and FIG. 4 simultaneously; FIG. 4 is diagram depicting the display with slide structure while the springs are stretched. As shown in FIG. 4, when the display 1 is push tilted, the stand 12 is forced to move upward, so that the movable unit 14 could drive the second holding parts 143 to stretch the springs 15. Afterward, if the display 1 is raised again, the movable unit 14 and stand 12 may return to bottom half of the display 1 due to the downward pull force of the springs 15. More specifically, the first holding parts 133 are disposed beneath the second holding parts 143; the springs 15 are disposed between the first holding parts 133 and the second holding parts 143. Wherein, the springs 15 has a tensile force against the first holding parts 133 and the second holding parts 143. When the stand 12 or the movable unit 14 is forced to move upward, the first holding parts 133 and the second holding parts 143 stretch the springs 15. When the force is vanished, the springs 15 could drive the stand 12 and the movable unit 14 moved downward by means of the elasticity. In this reason, the display 1 with slide structure of present invention might have simplifier mechanical configuration and make the stand 12 repeatedly move up and down against the display 1, so that the motion of the stand 12 and the tilted angle of the display 1 are both maximized. Besides, the display 1 is flat and without space-wasted, and thus may achieve thin character. Furthermore, the components of the display 1 are relatively few and the configuration is also simple, therefore the failure rate, manufacture and maintenance cost may be absolutely reduced as well.

In addition, when the display 1 is pushed tilted, the stand 12 and the movable unit 14 could be moved upward (shown in FIG. 5A-5B); meanwhile the pushed force might result in rotative torque between the movable unit 14 and the rail 132, and therefore the friction among the movable unit 14 and the rail 132 is absolutely increased. Thus, in order to conquer the problem and make the movement smooth, those skilled in the art might dispose lubricative layers 142 at the contact area between the rails 132 and the movable unit 14. The material of the lubricative layers 142 could be teflon, non-woven fabrics or other product with low friction coefficient. Then, the friction between the movable unit 14 and the rail 132 is thus reduced, so that the movement of the movable unit 14 is smooth and the display 1 is easily pushed tilted.

Figure 5A:
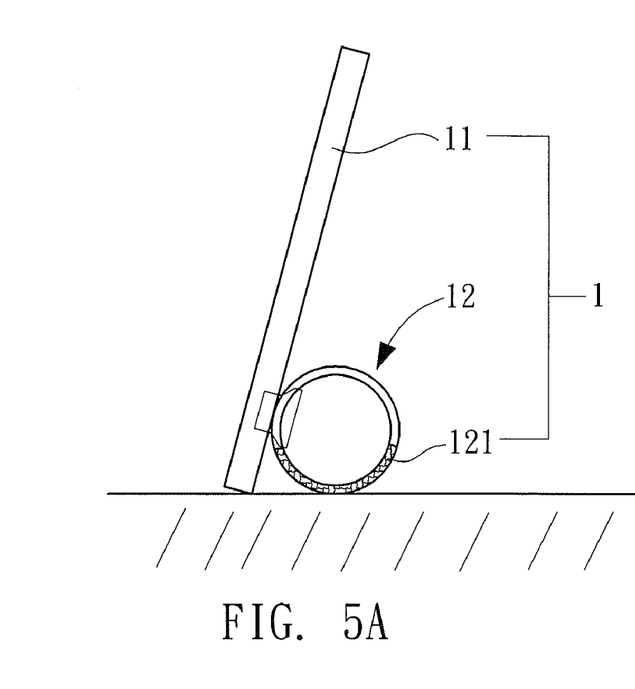
FIG. 5A is diagram depicting the display placed on the flat surface while the springs are not yet stretched.
Figure 5B:
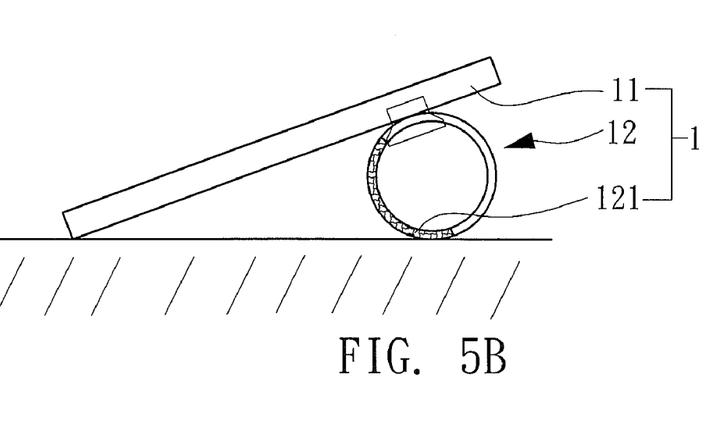
FIG. 5B is diagram depicting the display placed on the flat surface while the springs are stretched.

Next, please refer to FIG. 5A and FIG. 5B, FIG. 5A is diagram depicting the display placed on the flat surface while the springs are not yet stretched; FIG. 5B is diagram depicting the display placed on the flat surface while the springs are stretched. As shown in FIG. 5A and FIG. 5B, the curved arc structure 121 is used for touching the flat surface. In this scenario, the arc structure 121 is a circular ring, so that it could touch the flat surface by distinct sites of the arc structure 121 when the stand 12 is repeatedly moved against the rear casing 11. In this reason, the display 1 might be easily pushed tilted into specific angle by means of only one hand, instead of raising entire display 1 with effort. It would absolutely improve convenience.

Figure 6:
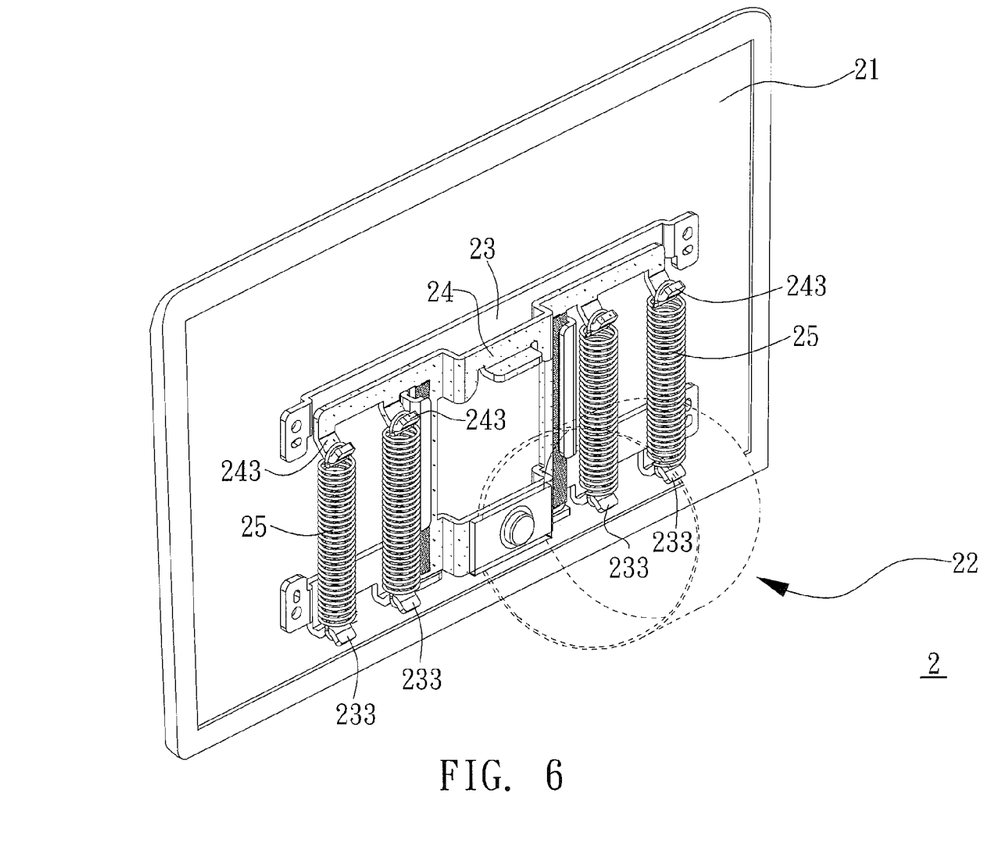
FIG. 6 is diagram depicting another embodiment of the display with slide structure.

If the display becomes larger and heavier, the display with slide structure of present invention may also be capable of utilization. Please refer to FIG. 6, FIG. 6 is diagram depicting another embodiment of the display with slide structure. As shown in FIG. 6, the display 2 includes a rear casing 21, a stand 22, a fixing unit 23, a movable unit 24 and four springs 25. The fixing unit 23 contains four first holding parts 233; the movable unit 24 contains four second holding parts 243; two ends of each spring 25 are respectively connected to one of the first holding parts 233 and one of the second holding parts 243. In this embodiment, the configuration has more springs 25, so as to sustain larger and heavier display 2, without increasing its thickness any more. Therefore, those skilled in the art might further increase the number of the spring 25, the first holding part 233 or the second holding part 243 to six, eight, ten or more, so as to sustain extremely larger or heavier display 2.

Figure 7:
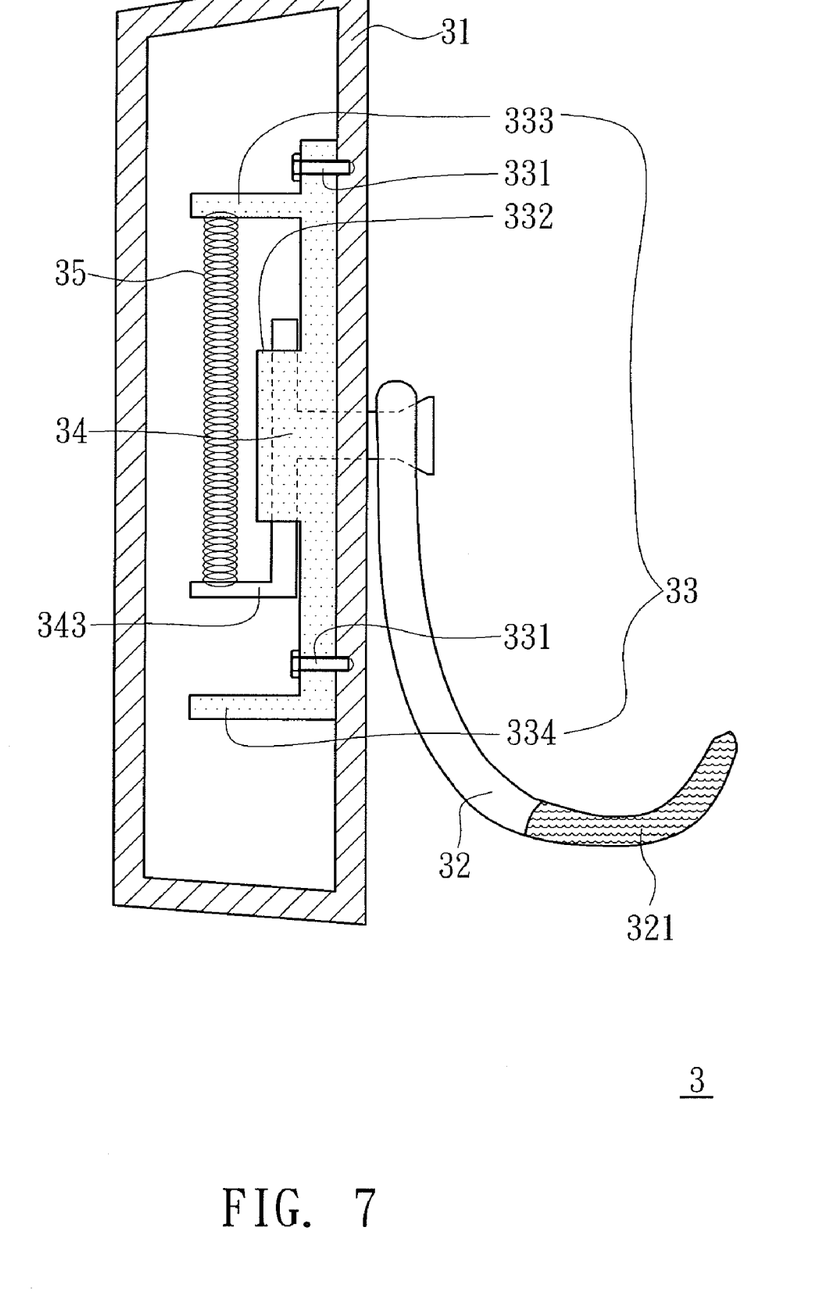
FIG. 7 is diagram depicting yet another embodiment of the display with slide structure.

Finally, please refer to FIG. 7, FIG. 7 is diagram depicting yet another embodiment of the display with slide structure. As shown in FIG. 7, the display 3 with slide structure of present invention includes a rear casing 31, a stand 32, a fixing unit 33, a movable unit 34 and a spring 35. The stand 32 has variant-curvature curve shape and contains an arc structure 321 disposed at end of the stand 32. The arc structure 321 could touch flat surface by distinct sites. Moreover, the surface of the arc structure 321 might be rough or coated with anti-slip material, so that it could have function of anti-slip. The fixing unit 33 contains a rail 332, a first holding part 333 and a resisting block 334. The fixing unit 33 is firmly fixed and disposed inside the rear casing 31 by means of two screws 331. The movable unit 34 contains a second holding part 343 disposed beneath. The stand 32 could be repeatedly moved up and down along with the movable unit 34. The first holding part 333 is disposed above the second holding part 343; the spring 35 is disposed between the first holding part 333 and the second holding part 343. Wherein, the spring 35 pushes the first holding part 333 and the second holding part 343 outward. When the stand 32 and the movable unit 34 is forced to move upward, the first holding part 333 and the second holding part 343 compress the spring 35. When the force is vanished, the springs 35 could drive the stand 32 and the movable unit 34 moved downward by means of the elasticity of the spring 35 to push the first holding part 333 and the second holding part 343 outward. Moreover, the resisting block 334 is disposed at beneath of the movable unit 34. When the movable unit 34 moves downward, the moving distance of the movable unit 34 could be limited, so as to prevent the movable unit 34 from leaving the rail 332. In this embodiment, the resisting block 334 is disposed on the fixing unit 33 and is one body shape with the fixing unit 33. In other embodiment, the resisting block 334 might be otherwise disposed on the rear casing 31, and it would achieve the same function of limiting the moving distance.

Summarily, the display with slide structure of present invention could reduce space occupation and manufacturing cost of the display, simplify the mechanical configuration and maximize the tilted angle of the display by only one hand, so as to achieve thin character. In addition, the components of the display are relatively few and the configuration is also simple, therefore the failure rate, manufacture and maintenance cost may be absolutely reduced as well. Furthermore, pluralities of springs could sustain larger and heavier display. Therefore, the present invention may have several advantages and improve convenience, and thus has extremely market potential.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

I claim:

1. A display with slide structure, comprising:
a rear casing;
a stand having an arc structure disposed beneath;
a fixing unit firmly disposed at the rear casing and containing at least one first holding part and at least one rail;
a movable unit connecting with the stand and containing at least one second holding part, wherein the movable unit is repeatedly movable by means of the rail;
at least one spring respectively connecting to the first holding part and the second holding part with two ends;
whereby, the stand could be repeatedly movable against the rear casing by means of the movable unit and touch a flat surface by distinct sites of the arc structure, so that the display might maximize its inclined angle.

2. The display with slide structure according claim 1, wherein a lubricative layer is disposed at the contact area between the rail and the movable unit.

3. The display with slide structure according claim 2, wherein the material of the lubricative layer could be teflon, non-woven fabrics or other product with low friction coefficient.

4. The display with slide structure according claim 1, wherein the shape of the arc structure could be circular arc, elliptical arc or the arc with variant curvature.

5. The display with slide structure according claim 1, wherein the surface of the arc structure is rough or coated with anti-slip material.

6. The display with slide structure according claim 1, wherein the movable unit and the stand is firmly fixed and connected by means of screw.

7. The display with slide structure according claim 1, wherein the fixing unit is firmly fixed at the rear casing by means of screw.

8. The display with slide structure according claim 1, wherein the first holding part or the second holding part is hook-shaped, so that the end of the spring could hook the first holding part or the second holding part.

9. The display with slide structure according claim 1, wherein the number of the spring, the first holding part and the second holding part is even number which is greater than 2, and then two ends of each spring are connected to one of the first holding parts and one of the second holding parts respectively.

10. The display with slide structure according claim 9, wherein the pluralities of the springs, the first holding parts and the second holding parts are respectively disposed at right and left of the movable unit with symmetry.

11. The display with slide structure according claim 1, wherein the first holding part is disposed beneath the second holding part and the spring is disposed between the first holding part and the second holding part, wherein the spring has a tensile force against the first holding part and the second holding part.

12. The display with slide structure according claim 11, wherein the first holding part and the second holding part stretch the spring when the stand or the movable unit is moved upward.

13. The display with slide structure according claim 1, wherein the first holding part is disposed above the second holding part and the spring is disposed between the first holding part and the second holding part, wherein the spring pushes the first holding part and the second holding part outward.

14. The display with slide structure according claim 13, wherein the first holding part and the second holding part compress the spring when the stand or the movable unit is moved upward.

15. The display with slide structure according claim 1, wherein the display further comprises at least one resisting block disposed at the fixing unit or at the rear casing, so as to limit the moving distance of the movable unit.

* * * * *